(12) United States Patent
Kulesha

(10) Patent No.: US 8,215,581 B1
(45) Date of Patent: Jul. 10, 2012

(54) ADVANCED CARGO RAMP

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 462 days.

(21) Appl. No.: 12/499,510

(22) Filed: Jul. 8, 2009

(51) Int. Cl.
*B64C 1/20* (2006.01)

(52) U.S. Cl. .................... 244/118.3; 244/137.1

(58) Field of Classification Search ........... 244/118.3, 244/137.1, 118.1, 129.5
See application file for complete search history.

(56) References Cited

U.S. PATENT DOCUMENTS

| | | | |
|---|---|---|---|
| 2,432,055 A * | 12/1947 | Watter et al. | 244/118.3 |
| 3,128,068 A * | 4/1964 | Pauli | 244/129.5 |
| 3,147,942 A * | 9/1964 | Griffith | 244/118.3 |
| 4,039,163 A | 8/1977 | Shorey | |
| 4,140,291 A * | 2/1979 | Evans et al. | 244/118.3 |
| 4,235,399 A | 11/1980 | Shorey | |
| 4,498,648 A * | 2/1985 | DeLuca et al. | 244/118.3 |
| 5,022,610 A * | 6/1991 | Ensign | 244/118.3 |
| 5,253,381 A | 10/1993 | Rawdon et al. | |
| 5,335,880 A * | 8/1994 | Klug | 244/118.3 |
| 6,616,100 B2 * | 9/2003 | Sankrithi | 244/119 |
| 7,275,717 B2 * | 10/2007 | Landry | 244/129.5 |

FOREIGN PATENT DOCUMENTS

WO    WO 9418068 A1 *   8/1994

\* cited by examiner

*Primary Examiner* — Christopher P Ellis
(74) *Attorney, Agent, or Firm* — Yee & Associates, P.C.

(57) ABSTRACT

A method and apparatus for operating a cargo ramp system. A ramp having a first end and a second end may be moved between a deployed position and an undeployed position using a movement system. The ramp may be maintained in a substantially horizontal position when the ramp is in the deployed position using a hinge system associated with the first end.

26 Claims, 12 Drawing Sheets

ADVANCED CARGO RAMP

GOVERNMENT LICENSE RIGHTS

This disclosure was made with Government support under contract number W911W6-08-2-0014 awarded by the United States Army. The Government has certain rights in this invention.

BACKGROUND INFORMATION

1. Field

The present disclosure relates generally to aircraft and, in particular, to aircraft that carry cargo. Still more particularly, the present disclosure relates to a method and apparatus for a ramp for use with an aircraft.

2. Background

Aircraft are often used for transporting cargo. Cargo may take various forms. For example, without limitation, cargo may include vehicles, shipping containers, crates, and/or other suitable items. Both fixed-wing and rotary-wing aircraft may carry cargo. Cargo may be any item other than passengers.

The loading and unloading of cargo from an aircraft may be performed using a ramp. In many cases, the ramp may be integrated as part of an aircraft. With this type of configuration, the ramp may be moved into a deployed position such that one end of the ramp contacts the ground. In this position, cargo may be moved onto and/or off the ramp to load and/or unload cargo from the aircraft using the ramp.

When cargo is unloaded from the aircraft, the cargo may be placed onto another vehicle, such as a truck, for transportation to a destination. When cargo is loaded onto the aircraft, the cargo may be moved from the vehicle or loading dock into the aircraft using the ramp.

This process of unloading and loading cargo may be labor intensive and time consuming. Further, in some cases, ground equipment needed for loading and unloading cargo may be scarce. The ground equipment may be, for example, without limitation, forklifts and/or other suitable equipment needed to move cargo. Depending on the amount of ground-support equipment available, the loading and unloading of cargo may take more time or may take longer than desired. If ground-support equipment is unavailable, then the loading and unloading of cargo may be delayed until the equipment is found or allocated.

Thus, it would be advantageous to have a method and apparatus that takes into account one or more of the issues discussed above, as well as possibly other issues.

SUMMARY

In one advantageous embodiment, an apparatus may comprise a ramp having a first end and a second end, a movement system, and a hinge system associated with the first end. The movement system may be configured to move the ramp between a deployed position and an undeployed position. The hinge system may be configured to maintain the ramp in a substantially horizontal position when the ramp is in the deployed position.

In another advantageous embodiment, an aircraft ramp system may comprise a ramp, a hinge system, a movement system, and a number of feet. The ramp may have a first end, a second end, a base, and an extendable section in which the extendable section may be configured to extend from the base to change a length of the ramp. The hinge system may be associated with the first end of the ramp and may be configured to maintain the ramp in a substantially horizontal position relative to a surface at a selected height when the ramp is in a deployed position. The hinge system may comprise a number of slidable hinges and a hydraulic cylinder. The number of slidable hinges may be associated with the first end of the ramp and a platform and may be configured to maintain the ramp in the substantially horizontal position when the ramp is moved to the deployed position on an uneven surface. The hydraulic cylinder may be configured to move the ramp towards and away from the platform in which the ramp may be moveable about an axis through the hydraulic cylinder. The hydraulic cylinder also may be configured to be locked. The movement system may be configured to move the ramp between the deployed position and an undeployed position and to move the ramp into the substantially horizontal position relative to the surface at the selected height. The movement system may comprise a plurality of linear actuators configured to move the ramp between the deployed position and the undeployed position, an adjustment screw having a first end associated with the base of the ramp, and a motor associated with the extendable section of the ramp. The motor may be coupled to the adjustment screw and configured to move the extendable section between a retracted position and an extended section. A first portion of the plurality of linear actuators may be configured to move the ramp by a first amount, and a second portion of the plurality of linear actuators may be configured to move the ramp by a second amount when moving the ramp to the deployed position in which the ramp may be in an angled position. All of the plurality of linear actuators may be activated when moving the ramp to the deployed position to maintain the ramp in the substantially horizontal position. The number of feet may be configured to support the ramp in the substantially horizontal position.

In yet another advantageous embodiment, a method may be present for operating a cargo ramp system. A ramp having a first end and a second end may be moved between a deployed position and an undeployed position using a movement system. The ramp may be maintained in a substantially horizontal position when the ramp is in the deployed position using a hinge system associated with the first end.

In still yet another advantageous embodiment, a method may be present for moving cargo using a ramp on an aircraft. The ramp having a first end and a second end may be moved between a deployed position and an undeployed position using a movement system in which the movement system may comprise a plurality of hydraulic cylinders configured to move the ramp between the deployed position and the undeployed position. The ramp may comprise a base and an extendable section in which the extendable section may be configured to extend from the base to change a length of the ramp. The ramp may be maintained in a substantially horizontal position when the ramp is in the deployed position using a hinge system associated with the first end. The hinge system may comprise a number of slidable hinges associated with the first end of the ramp and a platform and configured to maintain the ramp in the substantially horizontal position when the ramp is moved to the deployed position on an uneven surface. The hinge system also may comprise a hydraulic cylinder configured to move the ramp towards and away from the platform. The ramp may be moveable about an axis through the hydraulic cylinder. The hydraulic cylinder may be configured to be locked. A selected height of the ramp in the substantially horizontal position may be adjusted using the movement system. The extendable section may be moved to change the length of the ramp. The cargo may be moved using the ramp in the substantially horizontal position.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
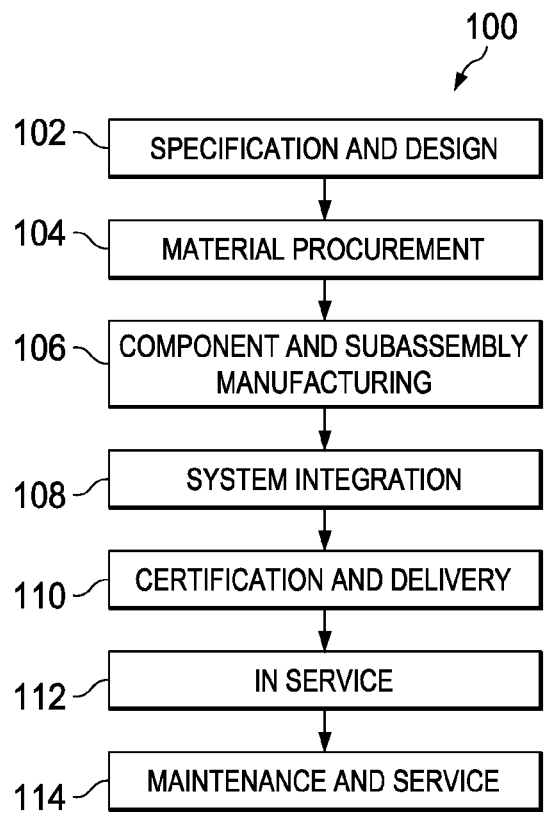
FIG. 1 is an illustration of an aircraft manufacturing and service method in accordance with an advantageous embodiment.
Figure 2:
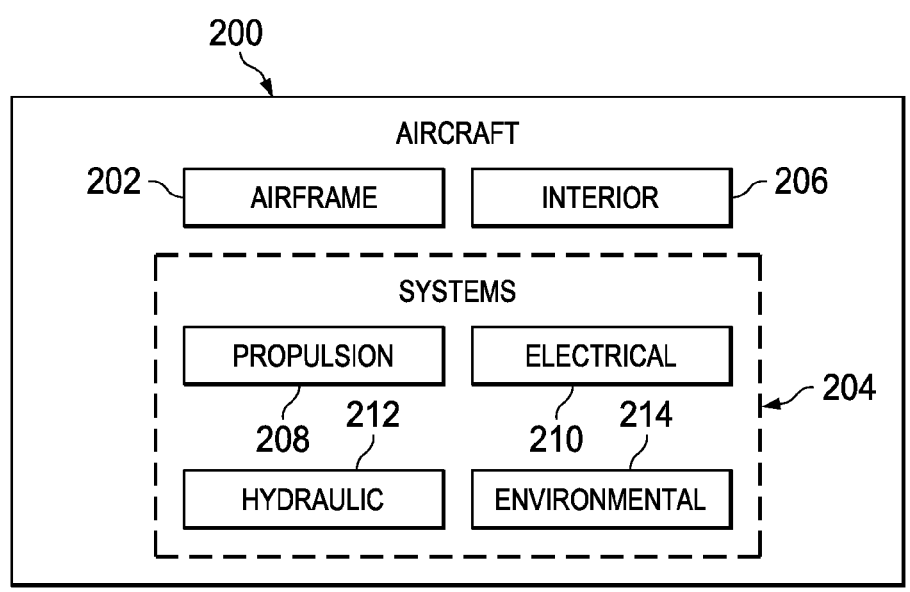
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of or reduce the cost of aircraft 200.

The different advantageous embodiments take into account a number of different considerations. For example, without limitation, the different advantageous embodiments recognize and take into account that existing ramp systems may have limitations that may affect the speed of loading and unloading of cargo from an aircraft. The different advantageous embodiments recognize and take into account that one solution may involve moving the truck or other vehicle close enough to directly load the cargo from the aircraft to the truck. One limitation may be the ability of moving a truck or trailer close enough to the ramp for direct loading from the aircraft to the truck.

This type of loading may reduce the need for ground-support equipment, such as forklifts. For example, without limitation, the different advantageous embodiments recognize that if the ramp is placed substantially horizontal between the aircraft and the bed of the truck, cargo, such as vehicles, may be moved directly from the cargo hold of the aircraft to the truck. Other types of cargo may be placed on pallets with wheels, reducing the need for ground-support equipment.

The different advantageous embodiments also recognize and take into account that in some situations, placement of the cargo ramp may be hindered due to uneven ground. With this situation, the surface of the truck or trailer may not be parallel to the surface of the cargo hold in the aircraft.

Thus, the different advantageous embodiments may provide a method and apparatus for a ramp. In one advantageous embodiment, an apparatus may comprise a ramp, a movement system, and a hinge system. The ramp may have a first end and a second end. The movement system may be configured to move the ramp between a deployed position and an undeployed position. The hinge system may be associated with the first end of the ramp and configured to maintain the ramp in a substantially horizontal position relative to a cargo surface when the ramp is in the deployed position.

Figure 3:
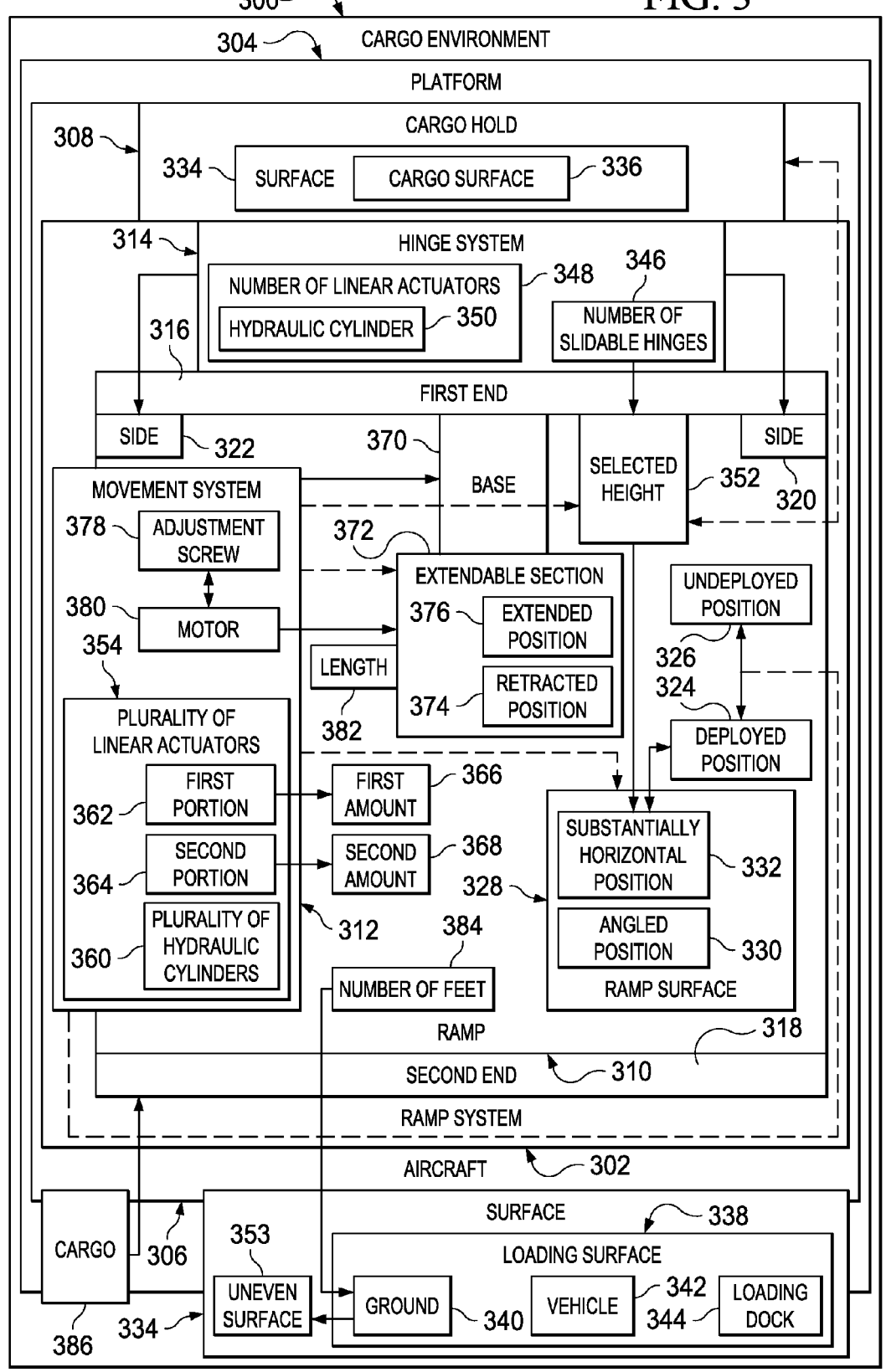
FIG. 3 is an illustration of a cargo environment in accordance with an advantageous embodiment.

Turning now to FIG. 3, an illustration of a cargo environment is depicted in accordance with an advantageous embodiment. In this illustrative example, cargo environment 300 may be implemented in aircraft 200 in FIG. 2.

As illustrated, ramp system 302 may be implemented in platform 304. In this illustrative example, platform 304 may take the form of aircraft 306. Aircraft 306 may be, for example, aircraft 200 in FIG. 2. Aircraft 306 may have cargo hold 308. Ramp system 302 may be associated with cargo hold 308. Ramp system 302 may have ramp 310, movement system 312, hinge system 314, and/or other suitable components.

Ramp 310 may have first end 316 and second end 318. Ramp 310 may be moved between deployed position 324 and undeployed position 326 by movement system 312. In one or more advantageous embodiments, ramp 310 may have ramp surface 328. Ramp surface 328 of ramp 310 may be in angled position 330 or substantially horizontal position 332 when in deployed position 324. In these illustrative examples, substantially horizontal position 332 may be substantially horizontal to surface 334.

Surface 334 may be, for example, without limitation, cargo surface 336, loading surface 338, and/or some other suitable surface. In these illustrative examples, cargo surface 336 may be in cargo hold 308. Loading surface 338 may be a surface such as, for example, without limitation, ground 340, vehicle 342, loading dock 344, and/or some other suitable surface.

In this illustrative example, hinge system 314 may comprise number of slidable hinges 346 and number of linear actuators 348. Number of linear actuators 348 may be, for example, without limitation, hydraulic cylinder 350. Hydraulic cylinder 350 may be, for example, without limitation, a mechanical actuator, which may be used to provide a linear force through a linear stroke.

Number of slidable hinges 346 may allow ramp 310 to have substantially horizontal position 332 at selected height 352. Selected height 352 may be adjusted through number of slidable hinges 346 and movement system 312 in these examples. Selected height 352 may be relative to surface 334.

Hinge system 314 may allow ramp 310 to have selected height 352 when in substantially horizontal position 332 in deployed position 324. Additionally, hinge system 314 also may allow first end 316 to have selected height 352 relative to cargo hold 308. In other words, selected height 352 may increase or decrease relative to surface 334 and/or cargo hold 308.

Additionally, hinge system 314 may be configured to maintain ramp 310 in substantially horizontal position 332 even when ground 340 on which aircraft 306 sits may be uneven surface 353. For example, without limitation, number of slidable hinges 346 and number of linear actuators 348 may allow ramp 310 to be tilted from side 320 to side 322. In other advantageous embodiments, ground 340 on which vehicle 342 sits may be uneven surface 353.

In these illustrative examples, movement system 312 may comprise plurality of linear actuators 354. Plurality of linear actuators 354 may take the form of plurality of hydraulic cylinders 360. First portion 362 and second portion 364 of plurality of linear actuators 354 may be configured to move ramp 310 by first amount 366 and second amount 368, respectively. This difference in movement may be performed to move ramp 310 into angled position 330 and substantially horizontal position 332. In some cases, the amount of movement may be no movement, depending on the particular position desired.

Further, in these illustrative examples, ramp 310 may have base 370 and extendable section 372. Extendable section 372 may have retracted position 374 and extended position 376. The movement of extendable section 372 between retracted position 374 and extended position 376 may be made by movement system 312.

Movement system 312 also may include adjustment screw 378 and motor 380. Adjustment screw 378 may be associated with base 370. Motor 380 may be associated with extendable section 372 and coupled to adjustment screw 378. Motor 380 may move extendable section 372 along adjustment screw 378 to move extendable section 372 between retracted position 374 and extended position 376. In this manner, length 382 of ramp 310 may be extended.

Further, ramp 310 also may have number of feet 384. Number of feet 384 may provide additional stability and/or support for ramp 310. In these examples, number of feet 384 may touch ground 340.

With ramp system 302, ramp 310 may be raised and/or lowered parallel to cargo surface 336 in the illustrative examples. Additionally, after cargo 386 has been moved onto ramp 310, movement system 312 may move ramp 310 in substantially horizontal position 332 to be substantially parallel to surface 334. Surface 334 may be loading surface 338, which may be, for example, without limitation, ground 340, vehicle 342, loading dock 344, and/or some other suitable surface.

The capability to maintain substantially horizontal position 332 for different values of selectable height 352 may be provided through at least one of movement system 312 and hinge system 314 in these illustrative examples. Further, ramp system 302 also may be configured to provide a capability to place ramp 310 in deployed position 324 at angled position 330.

Additionally, side 320 and side 322 may be tilted to maintain substantially horizontal position 332 with respect to loading surface 338. For example, in some advantageous embodiments, ground 340 may be uneven relative to vehicle 342, loading dock 344, and/or some other form of loading surface 338. As a result, cargo 386 may be loaded and unloaded directly from first end 316 and second end 318 without a requirement for equipment as needed by currently used systems.

The illustration of cargo environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, ramp 310 may not be configured for deployment into angled position 330. In yet other advantageous embodiments, extendable section 372 may be omitted from ramp 310. In some advantageous embodiments, ramp system 302 also may include rollers and/or conveyor systems on ramp surface 328. In still other advantageous embodiments, other types of movement systems other than linear actuators may be employed to move ramp 310 between deployed position 324 and undeployed position 326. For example, without limitation, cables may be used to raise and lower ramp 310 in some advantageous embodiments.

As yet another example, in some advantageous embodiments, ramp 310 may not include adjustment screw 378 and motor 380. In yet other advantageous embodiments, an additional number of adjustment screws and an additional number of motors may be present in addition to adjustment screw 378 and motor 380.

Figure 4:
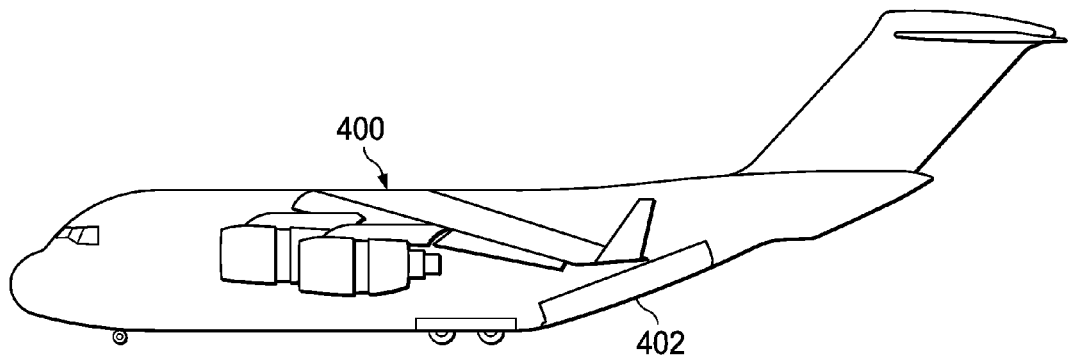
FIG. 4 is an illustration of an aircraft in accordance with an advantageous embodiment.

Turning now to FIG. 4, an illustration of an aircraft is depicted in accordance with an advantageous embodiment. In this example, aircraft 400 is an example of one implementation for aircraft 306 in FIG. 3. Aircraft 400, in this illustrative example, may have ramp system 402. Ramp system 402 is an example of one implementation for ramp system 302 in FIG. 3.

Figure 5:
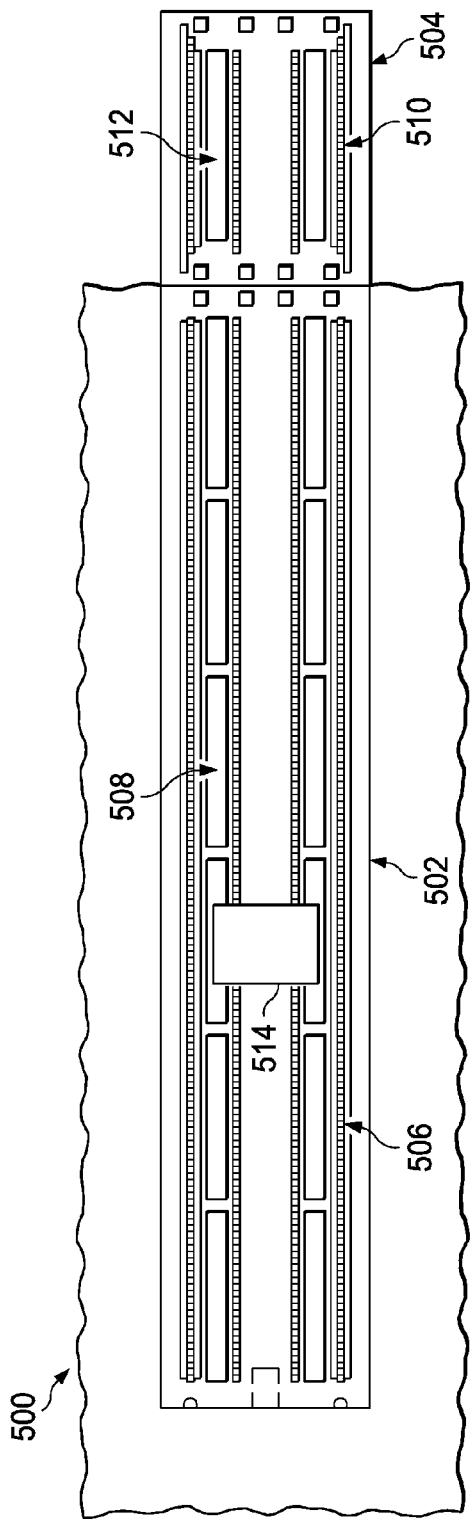
FIG. 5 is an illustration of a portion of an interior of an aircraft in accordance with an advantageous embodiment.

With reference now to FIG. 5, an illustration of a portion of an interior of an aircraft is depicted in accordance with an advantageous embodiment. In this example, interior 500 is an example of the interior of aircraft 400 in FIG. 4. As illustrated, interior 500 may include cargo hold 502 and ramp 504.

In this depicted example, cargo hold 502 may have rollers 506, conveyor system 508, and/or other suitable components. Ramp 504 also may have rollers 510 and conveyor system 512. In this illustrative example, cargo 514 may be moved between cargo hold 502 and ramp 504 using rollers 506, conveyor system 508, rollers 510, and conveyor system 512. These components may reduce the need for ground-support equipment when moving cargo 514.

Figure 6:
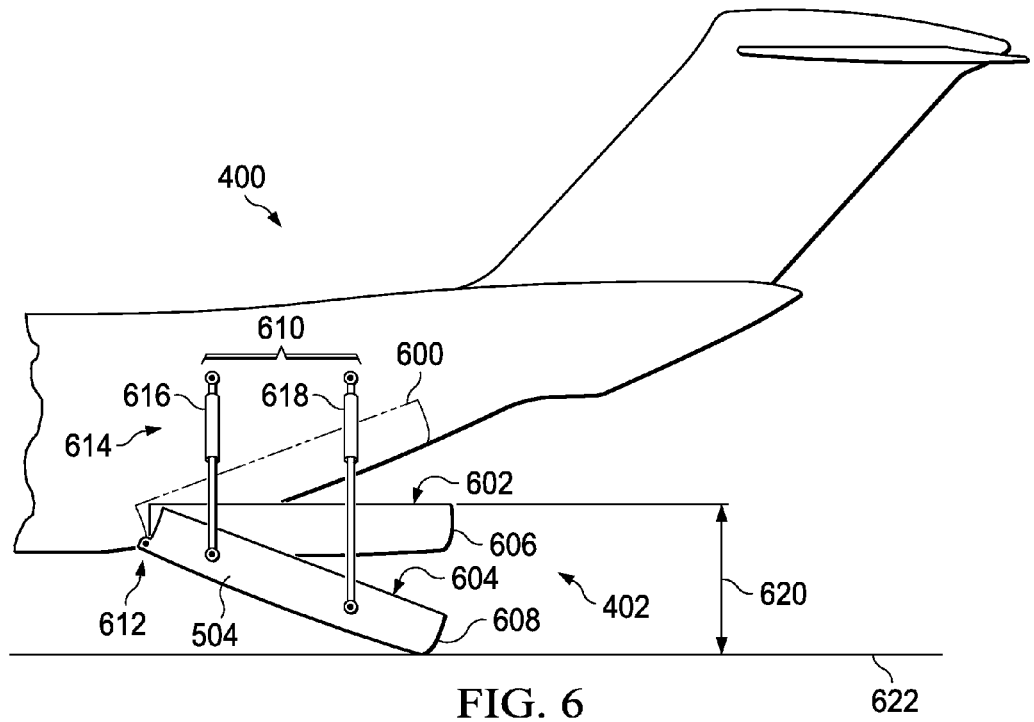
FIG. 6 is an illustration of a ramp system in accordance with an advantageous embodiment.

Turning next to FIG. 6, an illustration of a ramp system is depicted in accordance with an advantageous embodiment. As seen in this depicted example, ramp 504 in ramp system 402 may be moved between undeployed position 600 and at least one of deployed position 602 and deployed position 604. Of course, other deployed positions may be used, depending on the particular implementation. Deployed position 602 may be substantially horizontal position 606, while deployed position 604 may be angled position 608.

In this illustrative example, movement of ramp 504 may be performed using movement system 610 and hinge system 612. In this illustrative example, movement system 610 may include plurality of linear actuators 614. Plurality of linear actuators 614 may include hydraulic actuator 616 and hydraulic actuator 618. Additional hydraulic actuators may be present but not seen in this view. In this illustrative example, substantially horizontal position 606 may be parallel to cargo hold 502 in FIG. 5 and/or ground 622. In this example, ramp 504 may have selected height 620.

Figure 7:
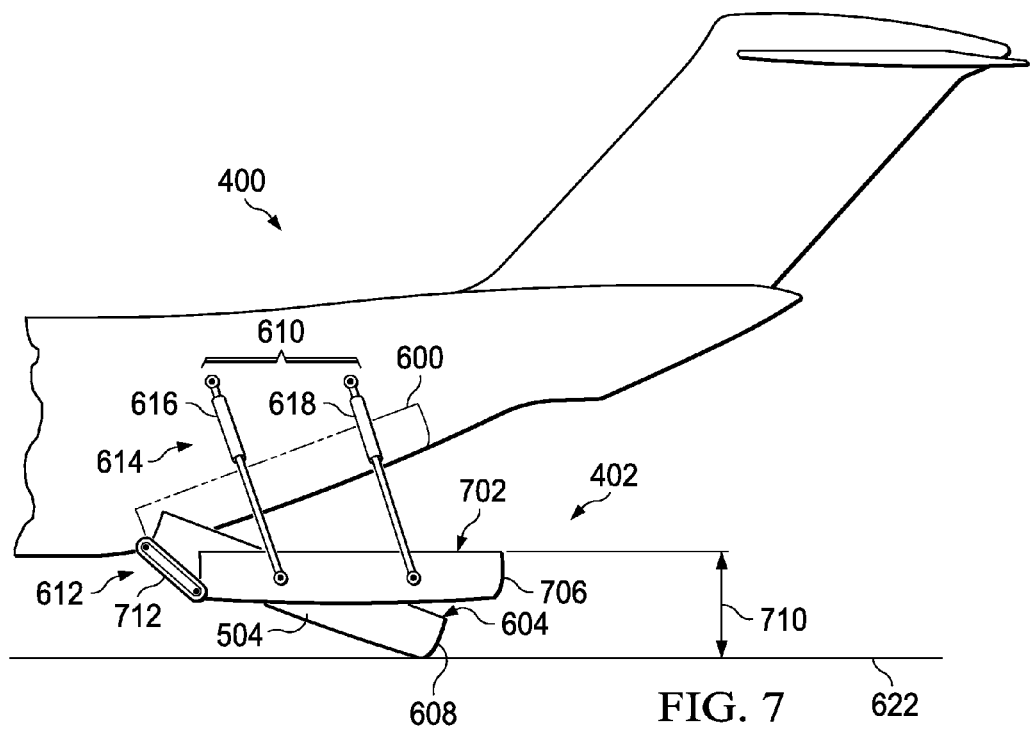
FIG. 7 is an illustration of a ramp system in accordance with an advantageous embodiment.

Turning now to FIG. 7, an illustration of a ramp system is depicted in accordance with an advantageous embodiment. In this illustrative example, ramp 504 in ramp system 402 may be moved between undeployed position 600 and at least one of deployed position 702 and deployed position 604. Deployed position 702 may be substantially horizontal position 706, while deployed position 604 may be angled position 608.

As can be seen in this illustrative example, selected height 710 may be different from selected height 620 in FIG. 6. The change in selected height 710 may be provided through hinge system 612 and movement system 610. In this example, slidable hinges 712 may provide a capability to change selected height 710.

Figure 8:
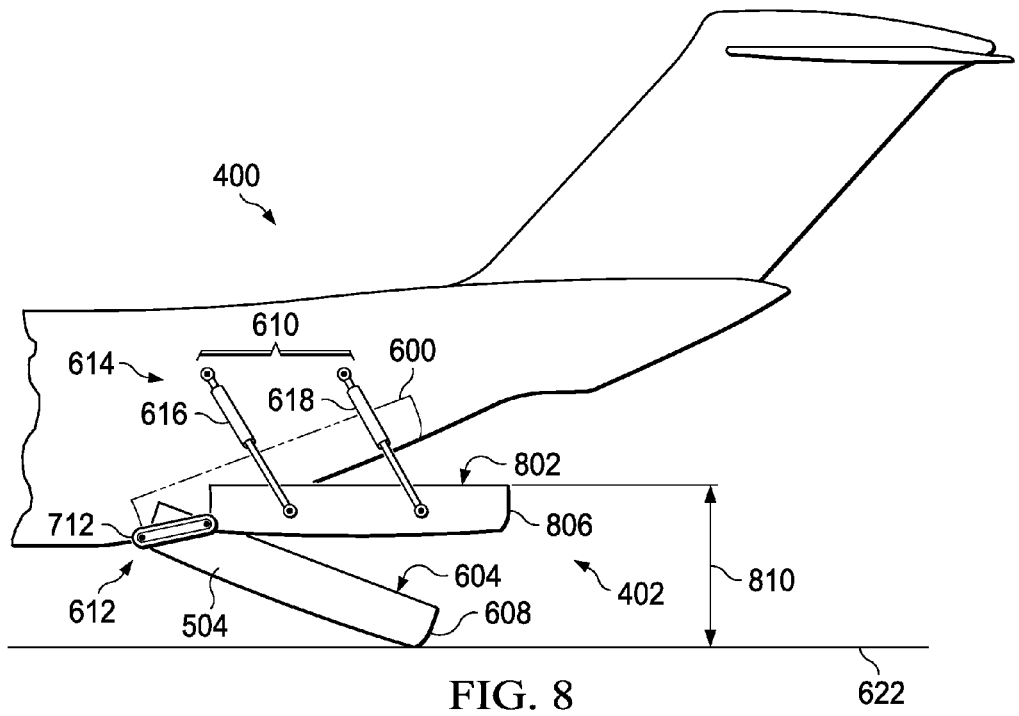
FIG. 8 is an illustration of a ramp system in accordance with an advantageous embodiment.

Turning now to FIG. 8, an illustration of a ramp system is depicted in accordance with an advantageous embodiment. In this illustrative example, ramp 504 in ramp system 402 may be moved between undeployed position 600 and one of deployed position 802 and deployed position 604. Deployed position 802 is substantially horizontal position 806, while deployed position 604 may be angled position 608. In this illustrative example, selected height 810 may have a different value from selected height 620 in FIG. 6 and selected height 710 in FIG. 7.

Figure 9:
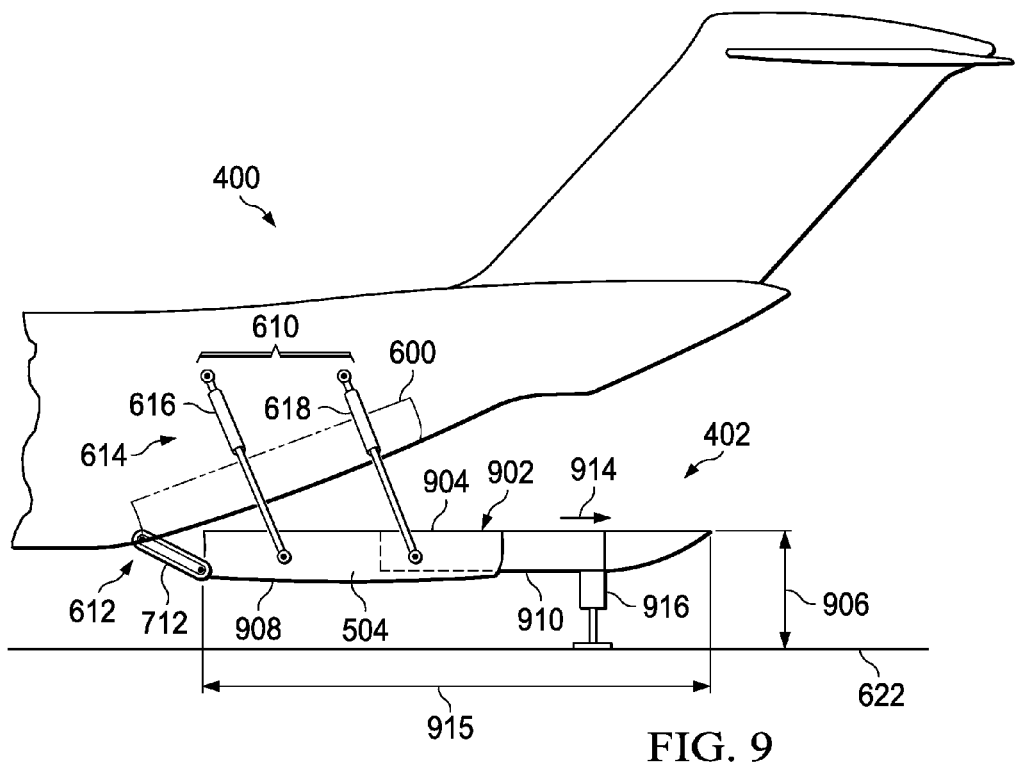
FIG. 9 is an illustration of a ramp system in accordance with an advantageous embodiment.

With reference to FIG. 9, an illustration of a ramp system is depicted in accordance with an advantageous embodiment. In this depicted example, ramp 504 in ramp system 402 may be moved between undeployed position 600 and deployed position 902. Deployed position 902 may be substantially horizontal position 904. Additionally, ramp 504 may have selected height 906 in substantially horizontal position 904. Selected height 906 may be a different value from selected height 620 in FIG. 6, selected height 710 in FIG. 7, and selected height 810 in FIG. 8. This change in height may be provided using hinge system 612 and movement system 610.

In this illustrative example, ramp 504 may have base 908 and extendable section 910. Extendable section 910 may move relative to base 908 along the direction of arrow 914 in these illustrative examples. In this manner, length 915 of ramp 504 may be changed as desired. Further, foot 916 may be associated with ramp 504. Foot 916 may contact ground 622 in this example. Foot 916 may provide additional support for ramp 504.

Figure 10:
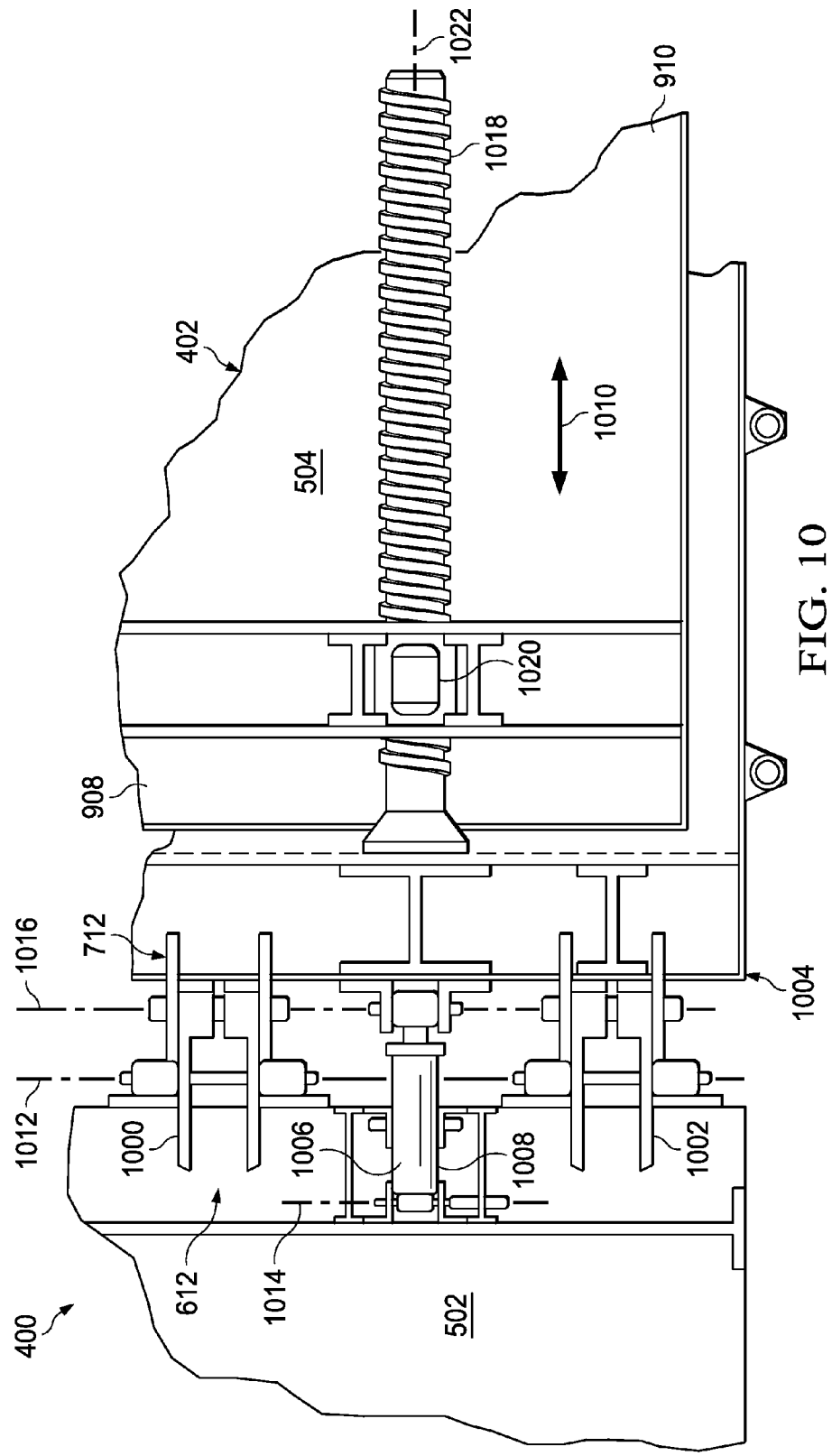
FIG. 10 is an illustration of a top view of a ramp system in accordance with an advantageous embodiment.

Turning to FIG. 10, an illustration of a top view of a ramp system is depicted in accordance with an advantageous embodiment. In this illustrative example, ramp system 402 may be seen from a partial exposed top view. In this view, only a portion of ramp system 402 is depicted to focus on features that may be present in one or more advantageous embodiments.

In this illustrative example, ramp 504 is shown associated with cargo hold 502. In this example, slidable hinge 1000 and slidable hinge 1002 in slidable hinges 712 connect first end 1004 of ramp 504 to cargo hold 502. Additionally, first end 1004 also may be connected to cargo hold 502 by linear actuator 1006. In these examples, linear actuator 1006 may move ramp 504 in the direction of arrow 1010. In other words, linear actuator 1006 may move ramp 504 towards and away from cargo hold 502. Slidable hinge 1000 and slidable hinge 1002 may allow ramp 504 to move in the direction of arrow 1010 in response to movement of linear actuator 1006. In this illustrative example, linear actuator 1006 may be hydraulic cylinder 1008.

In these illustrative examples, slidable hinge 1000 and slidable hinge 1002 may pivot about axis 1012. Hydraulic cylinder 1008 may pivot about axis 1014. Additionally, slidable hinge 1000, slidable hinge 1002, and hydraulic cylinder 1008 may pivot about axis 1016. In this example, axis 1016 may be moveable along the direction of arrow 1010.

As depicted, adjustment screw 1018 may be associated with base 908 of ramp 504. Motor 1020 is associated with extendable section 910. Further, motor 1020 may be coupled to adjustment screw 1018. Operation of motor 1020 may move extendable section 910 along the direction of arrow 1010.

In the illustrative example, ramp 504 may only include slidable hinge 1000, slidable hinge 1002, and hydraulic cylinder 1008. In other advantageous embodiments, additional slidable hinges and/or hydraulic cylinders may be found in ramp system 402 in the unshown portion of this system. An additional adjustment screw and motor, in addition to adjustment screw 1018 and motor 1020, may be present in the unshown portion, depending on the particular implementation. Of course, other variations in configurations may be present, depending on the particular implementation.

Further, in this illustrative example, slidable hinge 1000, slidable hinge 1002, and linear actuator 1006 of ramp 504 may move side to side about centerline axis 1022 for ramp 504.

Figure 11:
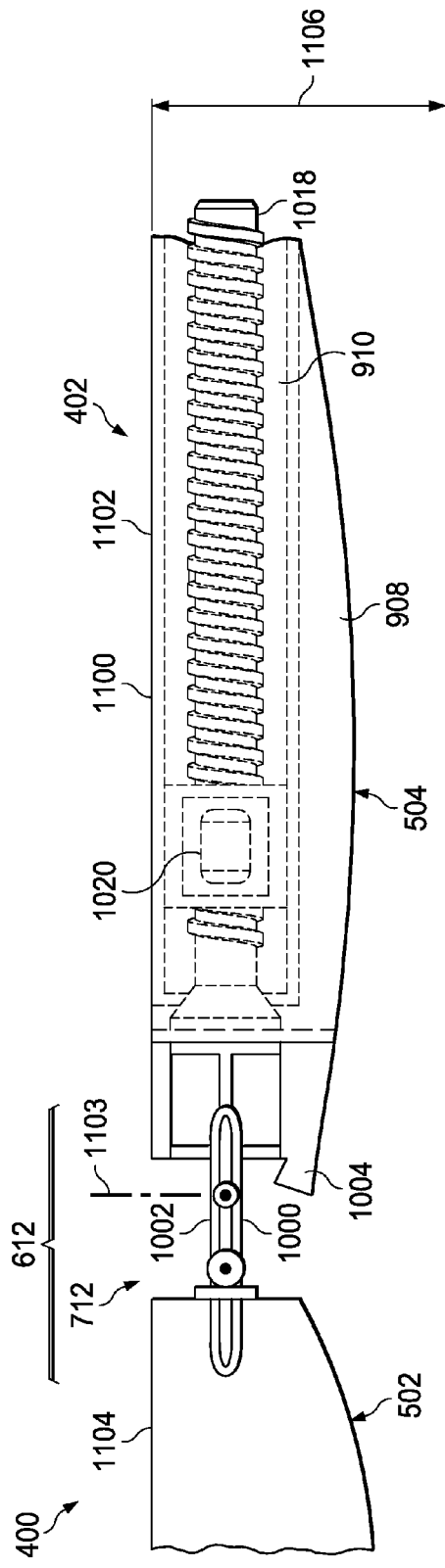
FIG. 11 is an illustration of a side view of a ramp system in accordance with an advantageous embodiment.

Turning now to FIG. 11, an illustration of a side view of a ramp system is depicted in accordance with an advantageous embodiment. In this illustrative example, an exposed side view of ramp system 402 is illustrated. In this illustrative example, surface 1100 may be in substantially horizontal position 1102 and may be substantially parallel to surface 1104 of cargo hold 502.

As depicted, slidable hinge 1000 and slidable hinge 1002 may allow first end 1004 of ramp 504 to move in the direction of arrow 1103. This movement may allow ramp 504 to maintain substantially horizontal position 1102. Also, these components may provide ramp 504 a capability to maintain substantially horizontal position 1102 at different values for distance 1106 relative to surface 1108.

Figure 12:
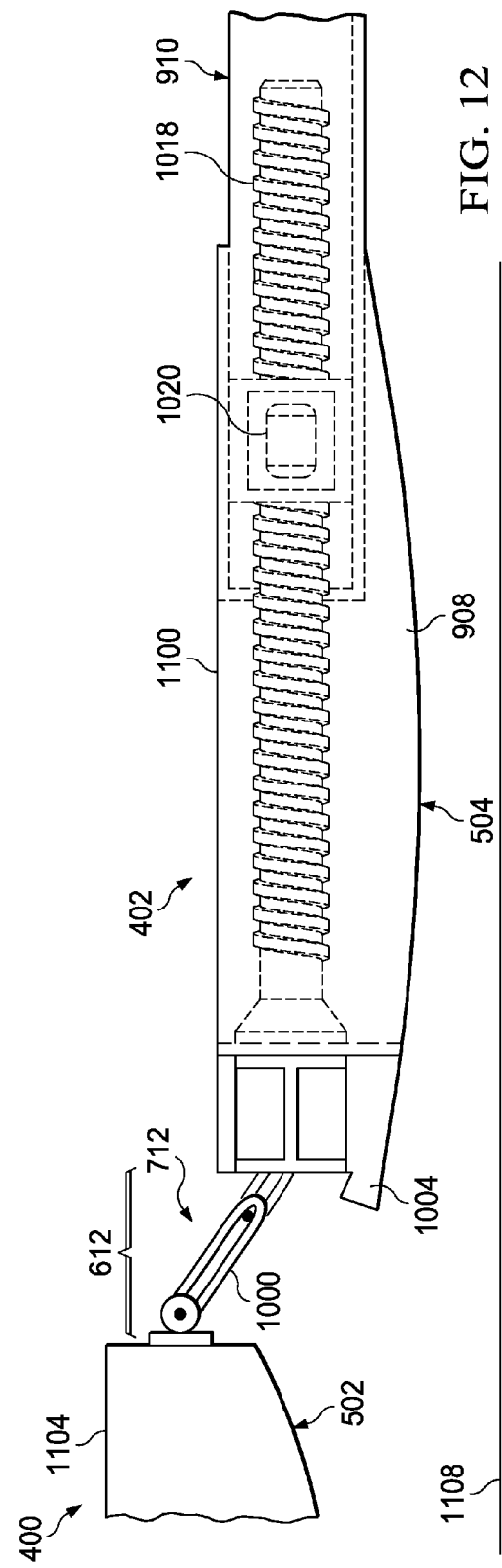
FIG. 12 is an illustration of a side view of a ramp system in accordance with an advantageous embodiment.

With reference next to FIG. 12, an illustration of a side view of a ramp system is depicted in accordance with an advantageous embodiment. In this illustrative example, ramp 504 may be in a substantially horizontal position. Ramp 504 also may be parallel to cargo hold 502. However, ramp 504 may be lower with respect to cargo hold 502. As can be seen in this example, the positioning of ramp 504 may be adjustable through the use of slidable hinges 712.

Figure 13:
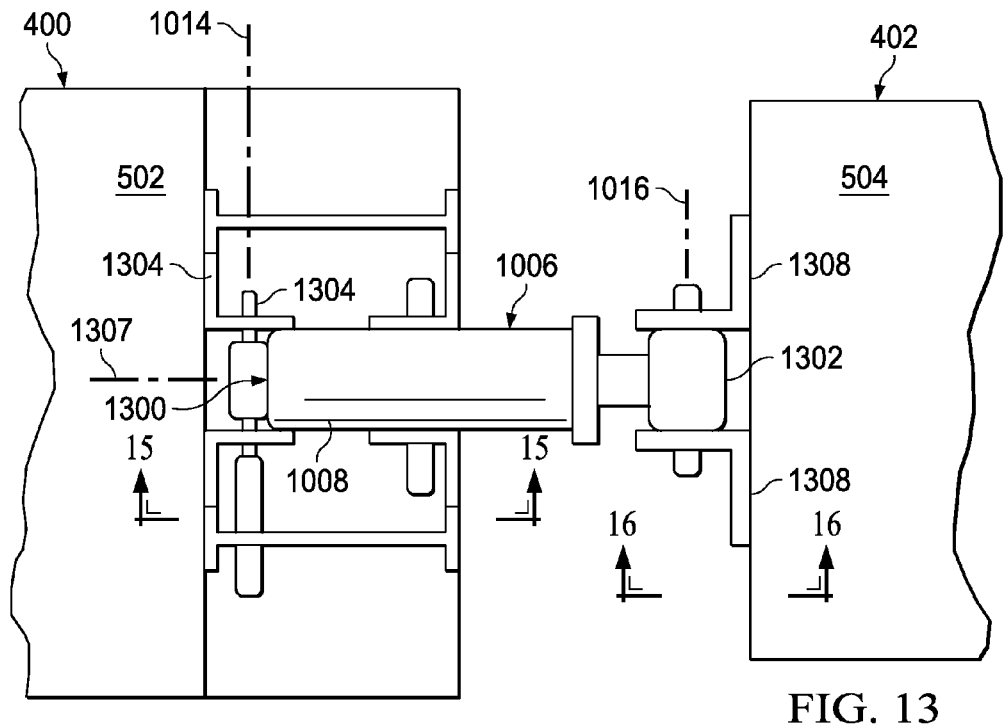
FIG. 13 is an illustration of a hydraulic cylinder in accordance with an advantageous embodiment.

In FIG. 13, an illustration of a hydraulic cylinder is depicted in accordance with an advantageous embodiment. In this illustration, hydraulic cylinder 1008 may have end 1300 and end 1302. End 1300 may be connected to cargo hold 502, while end 1302 may be connected to ramp 504.

In these examples, locking pin 1304 at end 1300 may be moveably connected to cargo hold 502. Locking pin 1304 may be locked to prevent pivoting of end 1300 about axis 1307. In the depicted examples, end 1302 of hydraulic cylinder 1008 may be rotatably connected to ramp fitting 1308. End 1302 may be capable of pivoting about axis 1016. Locking pin 1304 may be actuated in a manner that may prevent pivoting about axis 1014.

Figure 14:
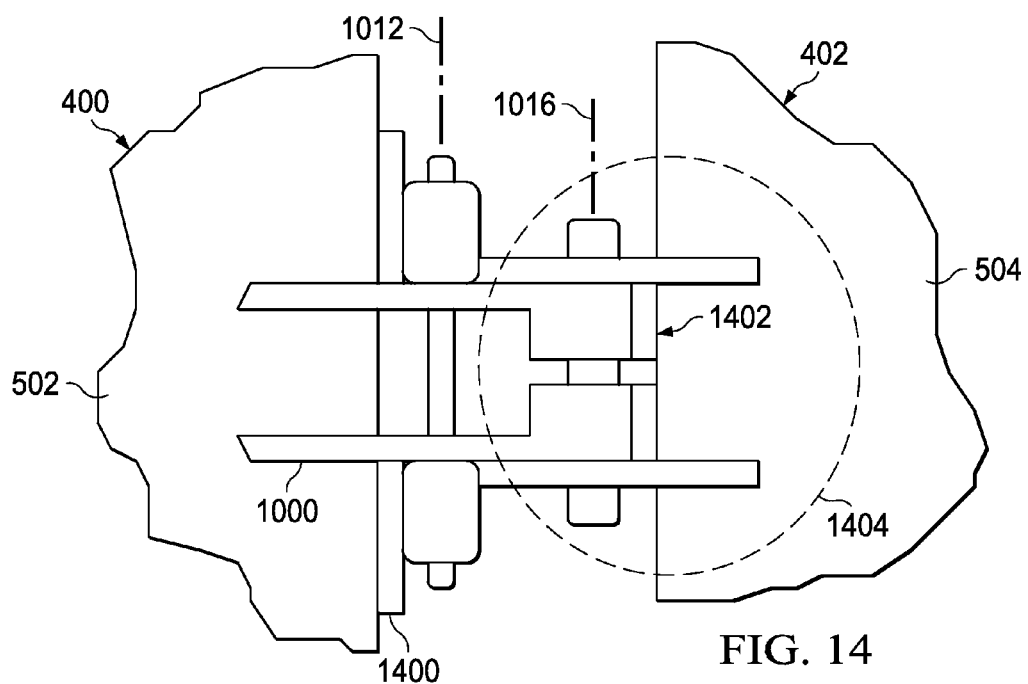
FIG. 14 is an illustration of a slidable hinge in accordance with an advantageous embodiment.

Turning now to FIG. 14, an illustration of a slidable hinge is depicted in accordance with an advantageous embodiment. In this illustrative example, slidable hinge 1000 may include cargo hold structure 1400 and ramp structure 1402. Cargo hold structure 1400 may be associated with cargo hold 502, while ramp structure 1402 may be associated with ramp 504.

In these illustrative examples, slidable hinge 1000 may pivot about axis 1012 and axis 1016. Ramp structure 1402 may slide with respect to cargo hold structure 1400.

Figure 15:
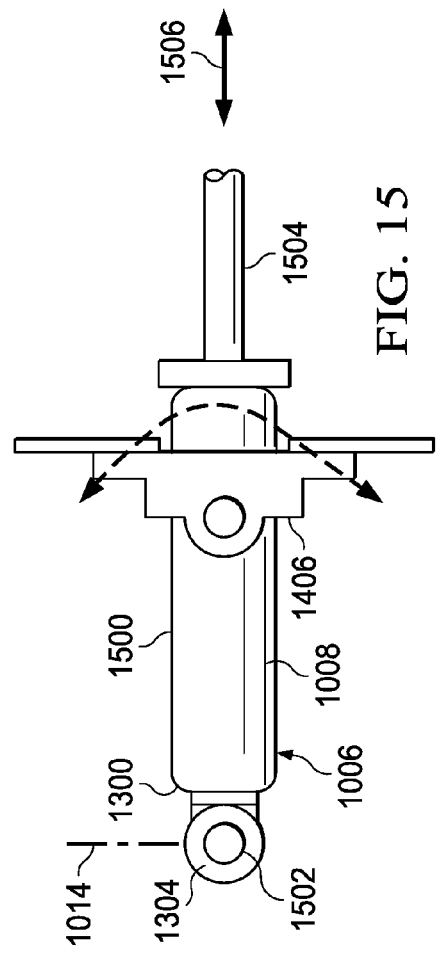
FIG. 15 is an illustration of a portion of a ramp system in accordance with an advantageous embodiment.

With reference next to FIG. 15, an illustration of a portion of a ramp system is depicted in accordance with an advantageous embodiment. In this illustrative example, ramp system 402 is shown from a view taken along lines 15-15 in FIG. 13. A more-detailed illustration of section 1404 is found in FIG. 17.

In this view, hydraulic cylinder 1008 is shown from a side view. In this example, housing 1500 is shown with pivot point 1502 around which hydraulic cylinder 1008 pivots about axis 1014. As shown in this view, locking pin 1304 may be locked to prevent rotation and/or pivoting of hydraulic cylinder 1008 about pivot point 1502. Also seen in this view is push rod 1504, which may move in the direction of arrow 1506 in these examples.

Figure 16:
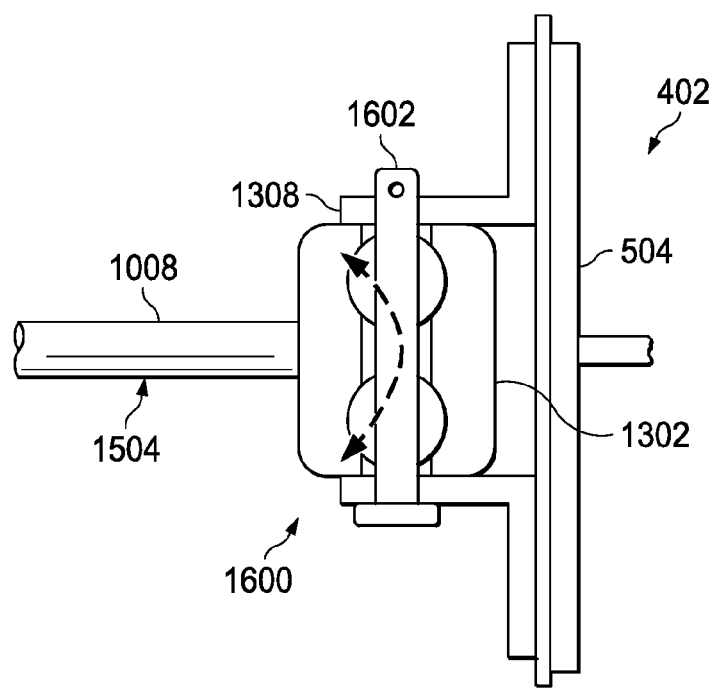
FIG. 16 is an illustration of a portion of a hydraulic cylinder in accordance with an advantageous embodiment.

With reference now to FIG. 16, an illustration of a portion of a hydraulic cylinder is depicted in accordance with an advantageous embodiment. In this illustrative example, a portion of hydraulic cylinder 1008 is shown taken from a view along lines 16-16 in FIG. 13. In this example, end 1302 of hydraulic cylinder 1008 may be connected to ramp 504. In this example, bearing system 1600 located at end 1302 of push rod 1504 may be coupled to ramp fitting 1308. Pin 1602 may keep bearing system 1600 coupled to ramp fitting 1308. In this example, bearing system 1600 may allow end 1302 to move in multiple axes.

Figure 17:
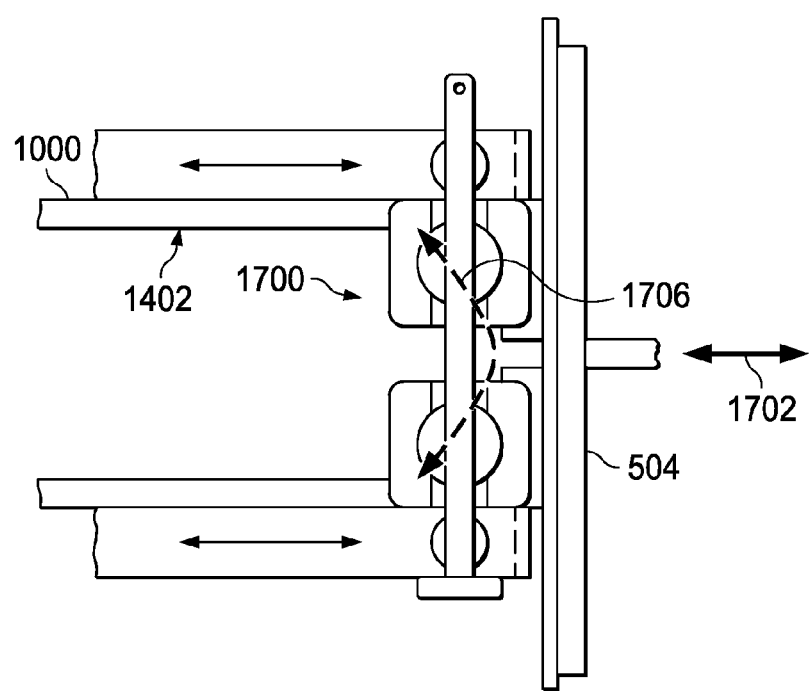
FIG. 17 is an illustration of a portion of a ramp system in accordance with an advantageous embodiment.

With reference now to FIG. 17, an illustration of a portion of a ramp system is depicted in accordance with an advantageous embodiment. In this illustrative example, an illustration of section 1404 in FIG. 14 is depicted in accordance with an advantageous embodiment.

In this illustrative example, bearing system 1700 may be connected to ramp 504. Bearing system 1700 may allow movement in the direction of arrow 1702. Bearing system 1700 may be located on cargo hold structure 1400. Bearing system 1700 also may allow movement of ramp 504 in the direction of arrow 1702 in these illustrative examples. Additionally, bearing system 1700 may allow ramp 504 to pivot in a number of different axes, not shown, in addition to the direction of arrow 1702.

Figure 18:
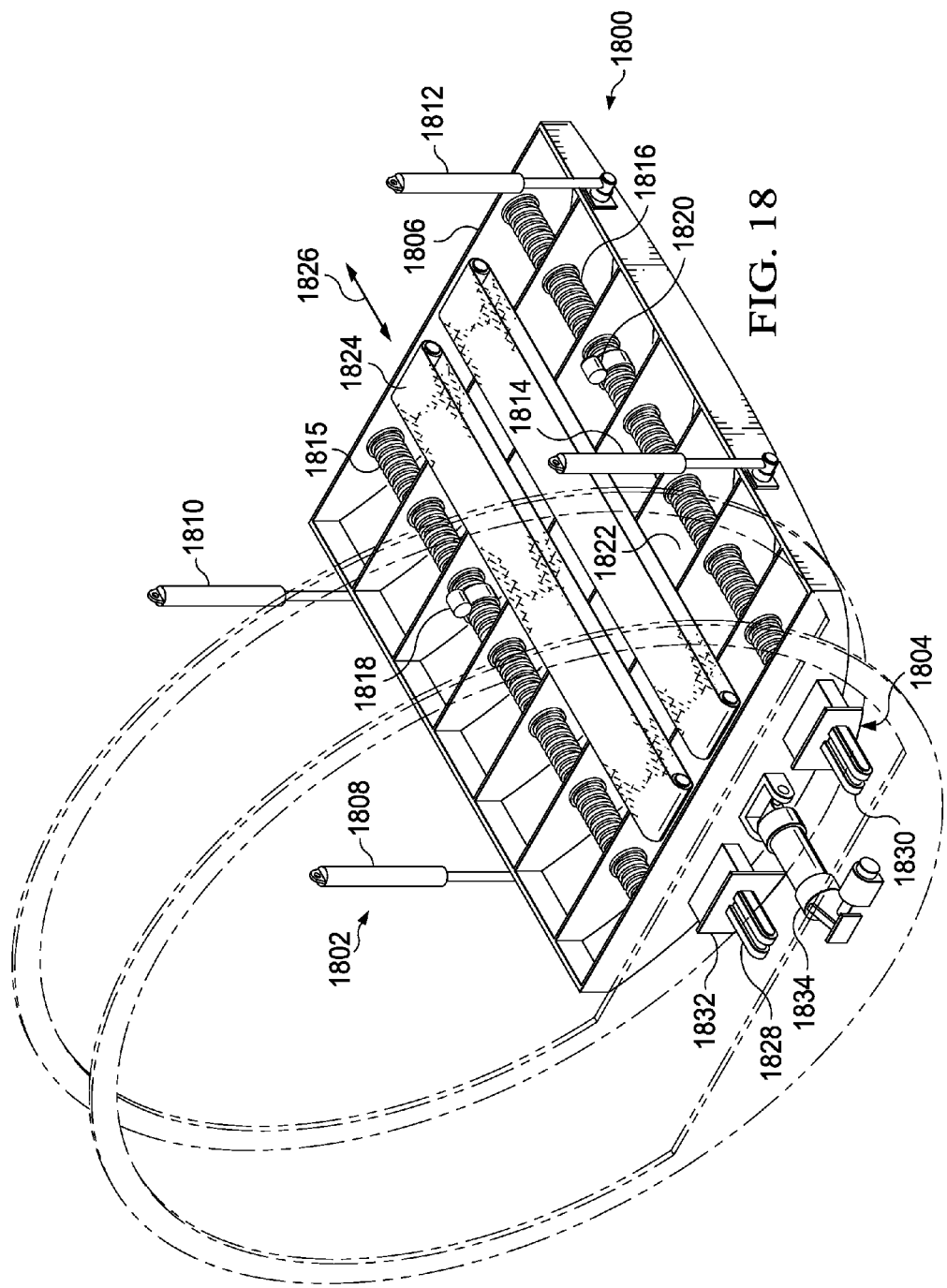
FIG. 18 is an illustration of a ramp system in accordance with an advantageous embodiment.

Turning next to FIG. 18, an illustration of a ramp system is depicted in accordance with an advantageous embodiment. In this illustrative example, ramp system 1800 is depicted in an exposed perspective view and is an example of yet another implementation of ramp system 302 in FIG. 3.

In this example, ramp system 1800 may include movement system 1802, hinge system 1804, and ramp 1806. In this illustrative example, ramp 1806 is shown in a perspective exposed view.

As illustrated, movement system 1802 may include hydraulic cylinders 1808, 1810, 1812, and 1814. Hydraulic cylinders 1808, 1810, 1812, and 1814 may raise ramp 1806 in these examples.

Further, movement system 1802 also may include adjustment screw 1815 and adjustment screw 1816. Additionally, movement system 1802 also may include motor 1818 and motor 1820. Adjustment screws 1815 and 1816 may be associated with base 1822 for ramp 1806. Motors 1818 and 1820 may be associated with extension 1824 for ramp 1806. Motor 1818 may be coupled to adjustment screw 1815, while motor 1820 may be coupled to adjustment screw 1816. Operation of motor 1818 and motor 1820 may move extension 1824 in the direction of arrow 1826.

In these illustrative examples, hinge system 1804 may include slidable hinge 1828 and slidable hinge 1830. Slidable hinge 1828 and slidable hinge 1830 may provide a connection between ramp 1806 and aircraft structure 1832 in these examples. Additionally, hinge system 1804, in these examples, also may include hydraulic cylinder 1834.

As can be seen in this illustrative example, ramp system 1800 may have two adjustment screws and motors as compared to the single adjustment screw and single motor illustrated in ramp system 402 in FIGS. 4-17.

The different illustrations of ramp 402 and ramp 1806 in FIGS. 4-18 are only illustrations of some ways in which ramp system 302 in FIG. 3 may be implemented in one or more advantageous embodiments. These illustrations are not meant to imply physical or architectural limitations to the manner in which other advantageous embodiments may be implemented.

For example, in some advantageous embodiments, additional hinge points or points of rotation may be present for hinge system 612 other than those illustrated. In yet other advantageous embodiments, additional hydraulic actuators, in addition to hydraulic actuator 616 and hydraulic actuator 618, may be used to position ramp 504. In yet other advantageous embodiments, a conveyor and roller system may be unnecessary within cargo hold 502 in interior 500 of aircraft 400.

Figure 19:
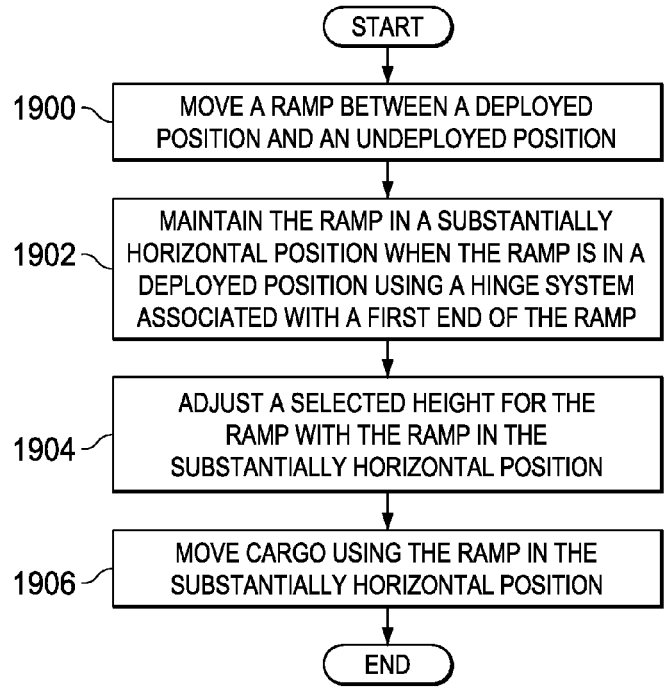
FIG. 19 is an illustration of a high-level flowchart of a process for operating a ramp in accordance with an advantageous embodiment.

With reference now to FIG. 19, an illustration of a high-level flowchart of a process for operating a ramp is depicted in accordance with an advantageous embodiment. The process illustrated in FIG. 19 may be implemented in cargo environment 300 in FIG. 3.

The process may begin by moving ramp 310 between deployed position 324 and undeployed position 326 (operation 1900). In these illustrative examples, ramp 310 may have first end 316 and second end 318. The movement of ramp 310 may be performed using movement system 312.

Ramp 310 may be maintained in substantially horizontal position 332 when ramp 310 is in deployed position 324 using hinge system 314 associated with first end 316 of ramp 310 (operation 1902). Selected height 352 is adjusted for ramp 310 with ramp 310 in substantially horizontal position 332 (operation 1904). Cargo 386 is moved using ramp 310 in substantially horizontal position 332 (operation 1906), with the process terminating thereafter.

Figure 20:
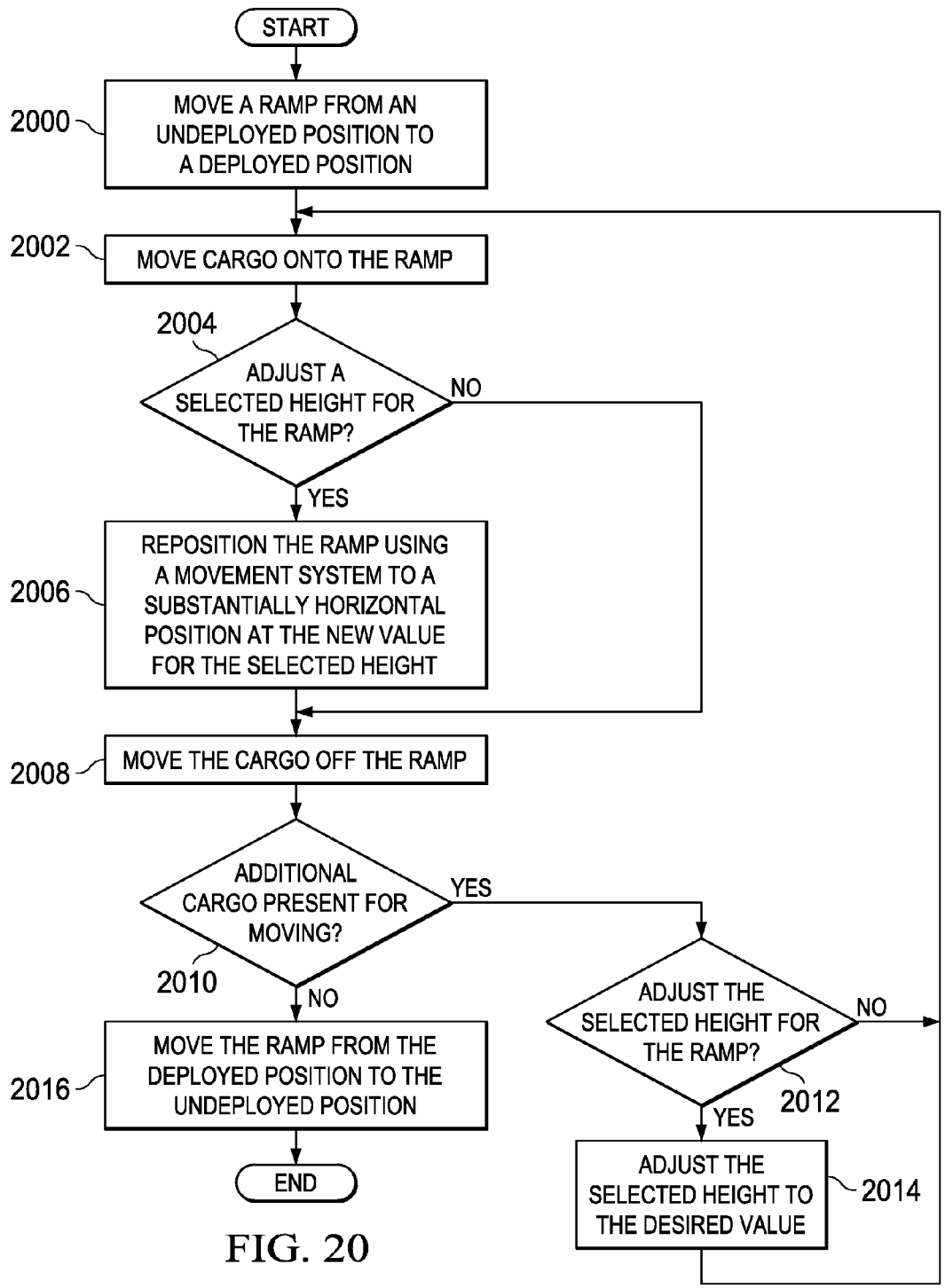
FIG. 20 is an illustration of a flowchart for operating a ramp system in accordance with an advantageous embodiment.

With reference now to FIG. 20, an illustration of a flowchart for operating a ramp system is depicted in accordance with an advantageous embodiment. The process illustrated in FIG. 20 may be implemented in cargo environment 300 in FIG. 3. More specifically, the process may be implemented using ramp system 302 in FIG. 3.

The process may begin by moving ramp 310 from undeployed position 326 to deployed position 324 (operation 2000). In these examples, in deployed position 324, ramp 310 may be in substantially horizontal position 332. The process may then move cargo 386 onto ramp 310 (operation 2002). A determination may be made as to whether selected height 352 for ramp 310 should be adjusted (operation 2004).

If selected height 352 is to be changed, movement system 312 may reposition ramp 310 in substantially horizontal position 332 at the new value for selected height 352 (operation 2006). This change in selected height 352 may be an increase or a decrease in selected height 352. This change in selected height 352 for ramp 310 may place ramp 310 in a substantially parallel position to surface 334 such as, for example, without limitation, cargo surface 336, loading surface 338, ground 340, vehicle 342, loading dock 344, or some other suitable surface.

The process may then move cargo 386 off ramp 310 (operation 2008). A determination may be made as to whether additional cargo is present for moving (operation 2010).

If additional cargo is present, a determination is made as to whether selected height 352 needs to be adjusted (operation 2012). If selected height 352 needs to be adjusted, movement system 312 may adjust selected height 352 to the desired value (operation 2014). The process may then return to operation 2002 as described above.

With reference again to operation 2012, if an adjustment to selected height 352 is not needed, the process may also return to operation 2002. With reference again to operation 2010, if additional cargo is not present for moving, the process may move ramp 310 from deployed position 324 to undeployed position 326 (operation 2016), with the process terminating thereafter.

With reference again to operation 2004, if an adjustment to selected height 352 is not needed, the process may proceed to operation 2008 as described above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, in FIG. 20, operation 2002 and 2004 may be performed in any order and may be performed simultaneously. In some advantageous embodiments, operation 2004 may be omitted.

Thus, the different advantageous embodiments provide a method and apparatus for managing cargo. In one advantageous embodiment, an apparatus comprises a ramp, a movement system, and a hinge system. The ramp has a first end and a second end. The movement system is configured to move the ramp between a deployed position and an undeployed position. The hinge system is associated with the first end of a ramp and is configured to maintain the ramp in a substantially horizontal position when the ramp is in the deployed position.

With a number of the different advantageous embodiments, the hinge system employing slidable hinges with the ramp may allow for full use of the cargo floor in an aircraft. The slidable hinges may allow for the ramp to be positioned in a substantially horizontal position relative to different loading surfaces. These loading surfaces may include the interior of the aircraft, a dock, a flatbed on a vehicle, the ground, or some other surface.

Further, at least some of the different advantageous embodiments may be used in a pressurized aircraft and may allow for the entire length of the ramp to be lowered below the cargo floor parallel to the ground. In this manner, side loading of containerized and pallet cargo may be performed in a more efficient manner as compared to having an angled position for the ramp. Further, the entire ramp may be tilted from side to side to compensate and/or adjust for uneven ground conditions when loading containerized cargo or pallets.

One or more of the different advantageous embodiments also may allow for extending the ramp to a length longer than the base. The extendable section of the ramp may increase the length of the ramp to allow for increased clearance for vehicles and more space for side loading. The ramp system used also may allow for an aerodynamic surface when the ramp is in the closed position without increasing drag on the aircraft. These and other advantageous embodiments may be realized through one or more features described above in the different illustrative examples.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been illustrated with respect to a platform in the form of an aircraft, other advantageous embodiments may be implemented using other types of platforms. For example, without limitation, one or more of the different advantageous embodiments may be implemented on a platform that may be a mobile platform, a stationary platform, a land-based structure, an aquatic-based structure, a space-based structure, or some other suitable type of platform or structure. As an example, the platform may be a helicopter, a space shuttle, or some other suitable type of vehicle or structure.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a ramp having a first end and a second end;
   a movement system connected to the ramp and configured to move the ramp between a deployed position and an undeployed position; and
   a hinge system having a first platform and a slidable hinge, wherein the slidable hinge has a third end and a fourth end, wherein the slidable hinge is connected on the third end to the first end of the ramp and on the fourth end to the first platform, and wherein the slidable hinge is configured to maintain the ramp in a substantially horizontal position when the ramp is in the deployed position.

2. The apparatus of claim 1, wherein the hinge system is configured to maintain the ramp in the substantially horizontal position relative to a surface at a selected height when the ramp is in the deployed position.

3. The apparatus of claim 2, wherein the movement system is configured to move the ramp into the substantially horizontal position relative to the surface at the selected height.

4. The apparatus of claim 2, wherein the hinge system is configured to allow the ramp to move along a centerline axis for the ramp.

5. The apparatus of claim 2, wherein the slidable hinge is configured to maintain the ramp in the substantially horizontal position when the ramp is moved to the deployed position on an uneven surface.

6. The apparatus of claim 2, wherein the movement system comprises:
   a second platform;
   a first linear actuator with a fifth end and a sixth end, wherein the fifth end is connected to the first end of the ramp and the sixth end is connected to the second platform, and wherein the first linear actuator is configured to move the ramp towards and away from the second platform; and
   a second linear actuator with a seventh end and an eighth end, wherein the seventh end is connected to the first end of the ramp and the eighth end is connected to the second platform, and wherein the second linear actuator is configured to move the ramp towards and away from the second platform.

7. The apparatus of claim 6, wherein the first linear actuator is a hydraulic cylinder.

8. The apparatus of claim 7, wherein the ramp is moveable about an axis through the hydraulic cylinder.

9. The apparatus of claim 8, wherein the hydraulic cylinder is configured to be locked to prevent rotation or pivoting of the hydraulic cylinder.

10. The apparatus of claim 6, wherein the first linear actuator is configured to move the ramp by a first amount and the second linear actuator is configured to move the ramp by a second amount when moving the ramp to the deployed position in which the ramp is in an angled position.

11. The apparatus of claim 6, wherein both the first linear actuator and the second linear actuator are activated when moving the ramp to the deployed position to maintain the ramp in the substantially horizontal position.

12. The apparatus of claim 6, wherein the first linear actuator and the second linear actuator
   is a hydraulic cylinder.

13. The apparatus of claim 1 further comprising:
   a number of feet with a length configured to support the ramp in the substantially horizontal position.

14. The apparatus of claim 1, wherein the ramp comprises:
   a base; and
   an extendable section configured to extend from the base to change a length of the ramp.

15. The apparatus of claim 14, wherein the movement system is further configured to move the extendable section of the ramp between a retracted position and an extended position.

16. The apparatus of claim 15, wherein the movement system further comprises:
   an adjustment screw having a ninth end connected to the base of the ramp; and
   a motor connected to the extendable section, wherein the motor is coupled to the adjustment screw and configured to move the extendable section between the retracted position and the extended position.

17. The apparatus of claim 2, wherein the surface is selected from at least one of a cargo surface and a loading surface.

18. The apparatus of claim 1 further comprising:
   a platform selected from one of a mobile platform, a stationary platform, a land-based structure, an aquatic-based structure, a space-based structure, an aircraft, an airplane, and a helicopter.

19. An aircraft ramp system comprising:
   a ramp having a first end, a second end, a base, and an extendable section in which the extendable section is configured to extend from the base to change a length of the ramp;
   a hinge system connected to the first end and configured to maintain the ramp in a substantially horizontal position relative to a surface at a selected height when the ramp is in a deployed position, wherein the hinge system comprises:
   a first platform; and
   a slidable hinge having a third end and a fourth end, wherein the third end is connected to the first end of the ramp and the second end is connected to the first platform, and wherein the slidable hinge is configured to maintain the ramp in the substantially horizontal position when the ramp is moved to the deployed position on an uneven surface;

a movement system configured to move the ramp between the deployed position and an undeployed position to move the ramp into the substantially horizontal position relative to the surface at the selected height and in which the movement system comprises:

a second platform;

a hydraulic cylinder having a fifth end and a sixth end, wherein the fifth end is connected to the first end of the ramp and the sixth end is connected to the second platform, and wherein the hydraulic cylinder is configured to move the ramp towards and away from the second platform, and wherein the ramp is moveable about an axis through the hydraulic cylinder and the hydraulic cylinder is configured to be locked;

a second linear actuator having a seventh end and an eighth end, wherein the seventh end is connected to the first end of the ramp and the eighth end is connected to the second platform, and wherein the second linear actuator is configured to move the ramp towards and away from the second platform; and an adjustment screw having a ninth end connected to the base of the ramp; and a motor connected to the extendable section, wherein the motor is coupled to the adjustment screw and configured to move the extendable section between a retracted position and an extended position, and wherein the hydraulic cylinder is configured to move the ramp by a first amount and the second linear actuator is configured to move the ramp by a second amount when moving the ramp to the deployed position in which the ramp is in an angled position, and wherein the hydraulic cylinder and the second linear actuator are activated when moving the ramp to the deployed position to maintain the ramp in the substantially horizontal position; and a number of feet configured to support the ramp in the substantially horizontal position.

20. A method for operating a cargo ramp system, the method comprising:

moving a ramp having a first end and a second end between a deployed position and an undeployed position using a movement system, wherein said movement system is connected to the second end of the ramp; and maintaining the ramp in a substantially horizontal position when the ramp is in the deployed position using a hinge system that comprises a slidable hinge and is connected to the first end of the ramp.

21. The method of claim 20 further comprising:
adjusting a selected height of the ramp in the substantially horizontal position using the movement system.

22. The method of claim 20 further comprising:
moving cargo using the ramp in the substantially horizontal position.

23. The method of claim 20, wherein the hinge system further comprises:
a first platform; and
a third end and a fourth end, wherein the third end is connected to the first end of the ramp and the second end is connected to the first a platform, and wherein the slidable hinge is configured to maintain the ramp in the substantially horizontal position when the ramp is moved to the deployed position on an uneven surface.

24. The method of claim 20, wherein the movement system comprises:

a second platform;

a hydraulic cylinder having a fifth end and a sixth end, wherein the fifth end is connected to the first end of the ramp and the sixth end is connected to the second platform, and wherein the hydraulic cylinder is configured to move the ramp towards and away from the second platform, and wherein the ramp is moveable about an axis through the hydraulic cylinder and the hydraulic cylinder is configured to be locked; and a second linear actuator with a seventh end and an eighth end, wherein the seventh end is connected to the first end of the ramp and the eighth end is connected to the second platform, and wherein the second linear actuator is configured to move the ramp towards and away from the second platform.

25. The method of claim 20, wherein the ramp comprises a base and an extendable section in which the extendable section is configured to extend from the base to change a length of the ramp and further comprising:

moving the extendable section to change the length of the ramp.

26. A method for moving cargo using a ramp on an aircraft, the method comprising:

moving the ramp having a first end and a second end between a deployed position and an undeployed position using a movement system, wherein the movement system comprises a second platform, a hydraulic cylinder having a fifth end and a sixth end, wherein the fifth end is connected to the first end of the ramp and the sixth end is connected to the second platform, and wherein the hydraulic cylinder is configured to move the ramp between the deployed position and the undeployed position towards and away from the second platform, and wherein the ramp is moveable about an axis through the hydraulic cylinder and the hydraulic cylinder is configured to be locked, and a second linear actuator with a seventh end and an eighth end, wherein the seventh end is connected to the first end of the ramp and the eighth end is connected to the second platform, and wherein the second linear actuator is configured to move the ramp towards and away from the second platform, and in which the ramp comprises a base and an extendable section wherein the extendable section is configured to extend from the base to change a length of the ramp;

maintaining the ramp in a substantially horizontal position when the ramp is in the deployed position using a hinge system connected to the first end, in which the hinge system comprises a first platform, and a slidable hinge having a third end and a fourth end, wherein the third end of the hinge system is connected to the first end of the ramp and the forth end is connected to the first platform, and wherein the slidable hinge is configured to maintain the ramp in the substantially horizontal position when the ramp is moved to the deployed position on an uneven surface;

adjusting a selected height of the ramp in the substantially horizontal position using the movement system;

moving the extendable section to change the length of the ramp; and moving the cargo using the ramp in the substantially horizontal position.

* * * * *